United States Patent
Takewaki et al.

(10) Patent No.: US 7,432,235 B2
(45) Date of Patent: Oct. 7, 2008

(54) LOW-FOAMING SILICONE COMPOSITION COMPRISING A POLYOXYALKYLENE/ PERFLUOROALKYL-COMODIFIED ORGANOPOLYSILOXANE

(75) Inventors: Kazuyuki Takewaki, Annaka (JP); Teruki Ikeda, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/013,666

(22) Filed: Jan. 14, 2008

(65) Prior Publication Data

US 2008/0171686 A1 Jul. 17, 2008

(30) Foreign Application Priority Data

Jan. 15, 2007 (JP) ............................. 2007-005567

(51) Int. Cl.
*C11D 1/82* (2006.01)
*C11D 9/36* (2006.01)

(52) U.S. Cl. ...................... 510/347; 510/466; 510/317; 510/343; 510/356; 510/421

(58) Field of Classification Search ................ 510/466, 510/317, 343, 347, 356, 421
See application file for complete search history.

(56) References Cited

U.S. PATENT DOCUMENTS

| 4,597,894 | A | * | 7/1986 | Abe et al. | ................. | 516/118 |
| 4,900,474 | A | * | 2/1990 | Terae et al. | ................. | 516/118 |
| 5,454,979 | A | * | 10/1995 | Kobayashi et al. | ......... | 516/120 |
| 6,300,283 | B1 | | 10/2001 | Sakuta | | |

FOREIGN PATENT DOCUMENTS

EP  0 355 650 A2  2/1990
JP  2005-336266  12/2005

* cited by examiner

*Primary Examiner*—Charles I Boyer
(74) *Attorney, Agent, or Firm*—Oblon, Spivak, McClelland, Maier & Neustadt, P.C.

(57) ABSTRACT

Provided is a low-foaming silicone composition, including: (A) from 51 to 99.9 parts by mass of a polyoxyalkylene-modified organopolysiloxane having a specific structure, (B) from 0.1 to 49 parts by mass of a polyoxyalkylene/perfluoroalkyl-comodified organopolysiloxane having a specific structure, and (C) from 0 to 48.9 parts by mass of a glycerol-modified organopolysiloxane having a specific structure (provided that the combined quantity of the component (A), the component (B) and the component (C) is 100 parts by mass). The silicone composition exhibits a powerful surfactant action and low foaming properties, and is useful as a spreading agent and a cleaning agent.

10 Claims, No Drawings

LOW-FOAMING SILICONE COMPOSITION COMPRISING A POLYOXYALKYLENE/ PERFLUOROALKYL-COMODIFIED ORGANOPOLYSILOXANE

BACKGROUND OF THE INVENTION

1. Field of the Invention

The present invention relates to a low-foaming silicone composition comprising an organopolysiloxane having a specific structure.

2. Description of the Prior Art

When agrichemicals are sprayed onto crops in order to kill weeds, exterminate insect pests, or prevent disease or the like, uneven adhesion of the agrichemicals to the crops can cause a deterioration in their effectiveness. Accordingly, in order to enable an agrichemical to adhere uniformly to a crop within as short a time as possible following spraying, and enable the active ingredient to penetrate into the crop leaves and the like before rain falls, a method is usually employed in which a surfactant is added as a spreading agent to an aqueous solution or aqueous dispersion of the agrichemical, thereby lowering the surface tension of the aqueous solution or aqueous dispersion.

Typical examples of the surfactants used include non-ionic surfactants such as polyoxyethylene alkylphenyl ethers, polyoxyethylene alkyl ethers and polyoxyethylene higher fatty acid esters. Furthermore, silicone-based surfactants are also used as they offer low toxicity and a powerful surfactant action. Of such silicone-based surfactants, polyether-modified silicones with a specific structure containing a trisiloxane skeleton within the principal chain exhibit the most powerful surfactant action, and these surfactants are already in widespread use as spreading agents for agrichemicals (see patent reference 1). Moreover, although these polyether-modified silicones suffer from a deterioration in the surfactant action under conditions where the pH is either acidic or basic, this drawback can be addressed by modifying the structure of the siloxane chain (see patent reference 2).

However, because aqueous solutions and aqueous dispersions of agrichemicals containing these types of spreading agents have a reduced surface tension, they tend to be prone to foaming. As a result, in order to prevent such foaming, an antifoaming agent is usually added during preparation of aqueous solutions or aqueous dispersions of agrichemicals. However, because the above agrichemical spreading agents, and particularly polyether-modified silicones, exhibit a powerful surfactant action, achieving complete suppression of foaming is difficult even when an antifoaming agent is added.

Moreover, if a large quantity of antifoaming agent is added in order to achieve a satisfactory antifoaming effect, then the effects of the spreading agent or the agrichemical itself may be impaired. Consequently, an agrichemical spreading agent that exhibits a powerful surfactant action but minimal foaming has been keenly sought.

In order to address the problems described above, a low-foaming spreading agent composition comprising a glycerol-modified organopolysiloxane has been proposed (see patent reference 3). However, although this composition exhibits excellent foam suppression properties, its ability to break down foam that has already formed, namely its foam-breaking properties, are inadequate.

Furthermore, because of their powerful surfactant action, silicone-based surfactants are also used in all manner of cleaning agents. For example, silicone-based surfactants can be used for cleaning the production apparatus and product-holding tank used during the production of an emulsion. Excessive foaming similar to that described above is also a problem in these types of applications.

[Patent Reference 1] EP 0 355 650 A2
[Patent Reference 2] U.S. Pat. No. 6,300,283 B1
[Patent Reference 3] JP 2005-336266 A

SUMMARY OF THE INVENTION

An object of the present invention is to provide a silicone composition that exhibits a powerful surfactant action and low foaming properties.

As a result of intensive investigation aimed at achieving the above object, the inventors of the present invention were able to complete the present invention.

In other words, the present invention provides a low-foaming silicone composition, comprising:

(A) from 51 to 99.9 parts by mass of a polyoxyalkylene-modified organopolysiloxane represented by a general formula (1) shown below:

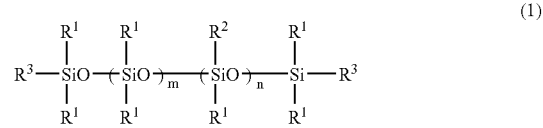

(1)

[wherein, each $R^1$ represents, independently, a hydroxyl group or an unsubstituted or substituted monovalent hydrocarbon group of 1 to 18 carbon atoms, $R^2$ represents an organic group represented by a general formula (2) shown below:

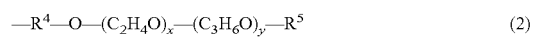

(2)

(wherein, each $R^4$ represents, independently, an unsubstituted or substituted bivalent hydrocarbon group of 2 to 8 carbon atoms, each $R^5$ represents, independently, a hydrogen atom, an unsubstituted or substituted monovalent hydrocarbon group of 1 to 6 carbon atoms, or an acetyl group ($-COCH_3$), x represents an integer from 4 to 15, y represents an integer from 0 to 10, and when y is not zero, the arrangement of the repeating units represented by the formula ($C_2H_4O$) and the repeating units represented by the formula ($C_3H_6O$) in the general formula (2) is either random or a block-type arrangement), each $R^3$ represents, independently, a hydroxyl group, an unsubstituted or substituted monovalent hydrocarbon group of 1 to 18 carbon atoms, or an organic group represented by the general formula (2), m represents an integer from 0 to 10, n represents an integer from 0 to 10, and a sum of m+n represents an integer from 1 to 20, provided that when n=0, at least one of the two $R^3$ groups in the general formula (1) is an organic group represented by the general formula (2)];

(B) from 0.1 to 49 parts by mass of a polyoxyalkylene/perfluoroalkyl-comodified organopolysiloxane represented by a general formula (3) shown below:

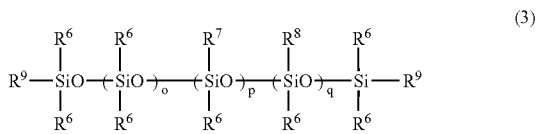

[wherein, each $R^6$ represents, independently, a hydroxyl group or an unsubstituted or substituted monovalent hydrocarbon group of 1 to 18 carbon atoms, $R^7$ represents an organic group represented by a general formula (4) shown below:

$$-R^{10}-O-(C_2H_4O)_z-(C_3H_6O)_w-R^{11} \quad (4)$$

(wherein, each $R^{10}$ represents, independently, an unsubstituted or substituted bivalent hydrocarbon group of 2 to 8 carbon atoms, each $R^{11}$ represents, independently, a hydrogen atom, an unsubstituted or substituted monovalent hydrocarbon group of 1 to 6 carbon atoms, or an acetyl group ($-COCH_3$), z represents an integer from 0 to 10, w represents an integer from 4 to 60, and when z is not zero, the arrangement of the repeating units represented by the formula ($C_2H_4O$) and the repeating units represented by the formula ($C_3H_6O$) in the general formula (4) is either random or a block-type arrangement), $R^8$ represents a perfluoroalkyl group-containing organic group represented by a general formula (5) shown below:

$$-R^{12}-(CF_2)_u-CF_3 \quad (5)$$

(wherein, each $R^{12}$ represents, independently, an unsubstituted or substituted bivalent hydrocarbon group of 2 to 8 carbon atoms, and u represents an integer from 0 to 13), each $R^9$ represents, independently, a hydroxyl group, an unsubstituted or substituted monovalent hydrocarbon group of 1 to 18 carbon atoms, or an organic group represented by the general formula (4) or the general formula (5), o represents an integer from 0 to 100, p represents an integer from 0 to 30, q represents an integer from 1 to 100, and a sum of o+p+q represents an integer from 5 to 200, provided that when p=0, at least one of the two $R^9$ groups in the general formula (3) is an organic group represented by the general formula (4)]; and (C) from 0 to 48.9 parts by mass of a glycerol-modified organopolysiloxane represented by a general formula (6) shown below:

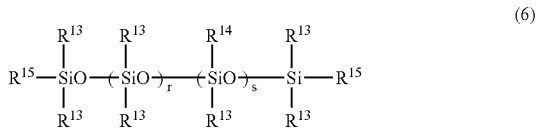

[wherein, each $R^{13}$ represents, independently, an unsubstituted or substituted monovalent hydrocarbon group of 1 to 18 carbon atoms, $R^{14}$ represents an organic group represented by a general formula (7) shown below:

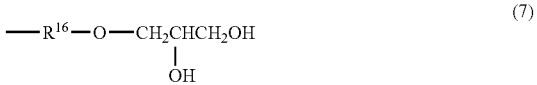

(wherein, each $R^{16}$ represents, independently, an unsubstituted or substituted bivalent hydrocarbon group of 2 to 8 carbon atoms), each $R^{15}$ represents, independently, an unsubstituted or substituted monovalent hydrocarbon group of 1 to 18 carbon atoms, or an organic group represented by the general formula (7), r represents an integer from 0 to 6, and s represents an integer from 0 to 2, provided that when s=0, at least one of the two $R^{15}$ groups in the general formula (6) is an organic group represented by the general formula (7)]

(provided that the combined quantity of the component (A), the component (B) and the component (C) is 100 parts by mass).

A second aspect of the present invention provides a spreading agent comprising the above composition.

A third aspect of the present invention provides a cleaning agent comprising the above composition.

A fourth aspect of the present invention provides a method for lowering the surface tension of a liquid, comprising adding the above composition to the liquid. Examples of the liquid include an aqueous solution or aqueous dispersion of an agrichemical.

A fifth aspect of the present invention provides a method for cleaning an article, comprising washing the article with the above composition. Examples of the article include a production apparatus and product-holding tank used during the production of an emulsion.

The silicone composition of the present invention exhibits a powerful surfactant action and has low foaming properties, and is consequently useful as a spreading agent, such as an agrichemical spreading agent, and as a cleaning agent, such as the cleaning agent used for cleaning the production apparatus and product-holding tank used during the production of an emulsion.

DETAILED DESCRIPTION OF THE PREFERRED EMBODIMENTS

A more detailed description of the present invention is provided below.

[Component (A)]

The polyoxyalkylene-modified organopolysiloxane of the component (A) in the present invention is represented by the general formula (1) shown below.

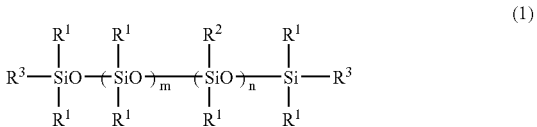

(wherein, $R^1$, $R^2$, $R^3$, m and n are as defined above)

Examples of $R^1$ include a hydroxyl group; alkyl groups such as a methyl group, ethyl group, propyl group, butyl group, pentyl group, hexyl group, heptyl group, octyl group, nonyl group, decyl group, dodecyl group, tridecyl group, tetradecyl group, hexadecyl group or octadecyl group; cycloalkyl groups such as a cyclopentyl group or cyclohexyl group; alkenyl groups such as a vinyl group or allyl group; aryl groups such as a phenyl group or tolyl group; aralkyl groups such as a benzyl group; and groups in which a portion of, or all of, the hydrogen atoms within one of the above hydrocarbon groups have been substituted with a cyano group or amino group or the like, such as a cyanoethyl group, 3-aminopropyl group or N-β-(aminoethyl)-γ-aminopropyl group. Of these, a methyl group is preferred in terms of factors such as the surfactant action of the resulting component (A) and the ease of availability, and compounds in which at least 80 mol % (namely, from 80 to 100 mol %) of all the $R^1$ groups are methyl groups are preferred.

The group $R^2$ is an organic group represented by the general formula (2) shown below.

$$-R^4-O-(C_2H_4O)_x-(C_3H_6O)_y-R^5 \qquad (2)$$

(wherein, $R^4$, $R^5$, x, y, and the arrangement of the repeating units represented by the formula $(C_2H_4O)$ and the repeating units represented by the formula $(C_3H_6O)$ are as defined above)

Examples of $R^4$ include an ethylene group, propylene group (trimethylene group), or butylene group (tetramethylene group).

Examples of $R^5$ include a hydroxyl group; alkyl groups such as a methyl group, ethyl group, propyl group, butyl group, pentyl group or hexyl group; and an acetyl group.

If the value of x is less than 4, then the water solubility of the component (A) falls, whereas if x exceeds 15, then the surfactant action of the component (A) may deteriorate. Moreover, the molar ratio represented by x/(x+y) is preferably not less than 0.4 (namely, from 0.4 to 1). If this molar ratio is less than 0.4, then the water solubility of the component (A) may deteriorate.

Accordingly, examples of the above group $R^2$ include the groups shown below.

—$C_3H_6O(C_2H_4O)_6H$
—$C_3H_6O(C_2H_4O)_{10}H$
—$C_3H_6O(C_2H_4O)_5CH_3$
—$C_3H_6O(C_2H_4O)_8CH_3$
—$C_3H_6O(C_2H_4O)_{10}(C_3H_6O)_1CH_3$
—$C_3H_6O(C_2H_4O)_{10}(C_3H_6O)_4C_4H_9$
—$C_3H_6O(C_2H_4O)_8$—CO—$CH_3$
—$C_3H_6O(C_2H_4O)_{10}(C_3H_6O)_1$—CO—$CH_3$

Furthermore, examples of $R^3$ include the groups exemplified above for the group $R^1$ and the groups exemplified above for the group $R^2$, although when n=0, at least one of the two $R^3$ groups in the general formula (1) is a group such as those exemplified above for the group $R^2$.

If the value of m exceeds 10, then the hydrophilicity of the component (A) may become overly weak, causing a deterioration in the surfactant action. If the value of n exceeds 10, then the molecular weight of the component (A) may become overly large, causing a deterioration in the surfactant action.

Specific examples of the component (A) include the compounds shown below.

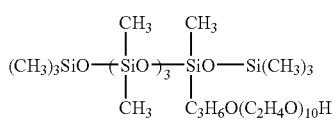

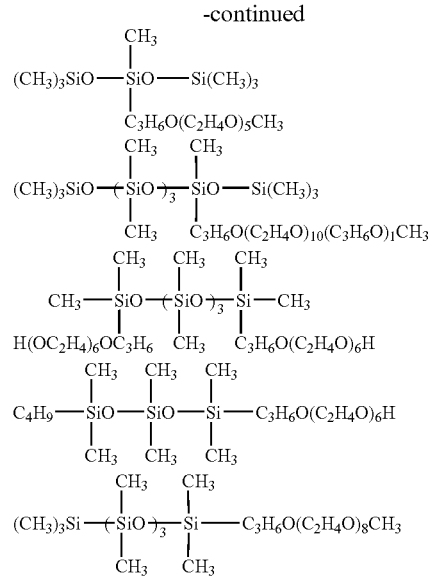

The polyoxyalkylene-modified organopolysiloxane of the component (A) may use either a single compound or a combination of two or more different compounds.

[Component (B)]

The polyoxyalkylene/perfluoroalkyl-comodified organopolysiloxane of the component (B) in the present invention is represented by the general formula (3) shown below.

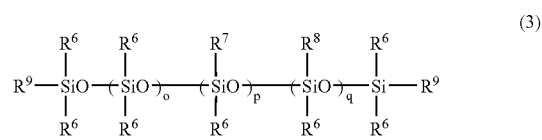

[wherein, $R^6$, $R^7$, $R^8$, $R^9$, o, p and q are as defined above)

Examples of $R^6$ include the same groups as those exemplified above for the group $R^1$ in the general formula (1). Furthermore, as was the case for $R^1$, at least 80 mol % (namely, from 80 to 100 mol %) of all the $R^6$ groups are preferably methyl groups.

The group $R^7$ represents an organic group represented by the general formula (4) shown below.

$$-R^{10}-O-(C_2H_4O)_z-(C_3H_6O)_w-R^{11} \qquad (4)$$

(wherein, $R^{10}$, $R^{11}$, z, w, and the arrangement of the repeating units represented by the formula $(C_2H_4O)$ and the repeating units represented by the formula $(C_3H_6O)$ are as defined above). Examples of $R^{10}$ include the same groups as those exemplified above for the group $R^4$ in the general formula (2). Examples of $R^{11}$ include the same groups as those exemplified above for the group $R^5$ in the general formula (2).

If the value of w is less than 4, then the compatibility of the component (B) with the component (A) deteriorates, whereas if w exceeds 60, then the surfactant action of the component (B) may deteriorate. Moreover, the molar ratio represented by z/(z+w) is preferably not more than 0.4 (namely, from 0 to 0.4). If this molar ratio exceeds 0.4, then the water dispersibility of the component (B) increases, which may cause a deterioration in the antifoaming properties.

Accordingly, examples of the above group $R^7$ include the groups shown below.

—$C_3H_6O(C_3H_6O)_{25}H$
—$C_3H_6O(C_2H_4O)_3(C_3H_6O)_{15}H$
—$C_3H_6O(C_2H_4O)_6(C_3H_6O)_{24}CH_3$
—$C_3H_6O(C_2H_4O)_3(C_3H_6O)_{15}C_4H_9$
—$C_3H_6O(C_3H_6O)_8C_4H_9$
—$C_3H_6O(C_2H_4O)_3(C_3H_6O)_{15}$—CO—$CH_3$
—$C_3H_6O(C_3H_6O)_{25}$—CO—$CH_3$

The group $R^8$ represents a perfluoroalkyl group-containing organic group represented by the general formula (5) shown below.

$$—R^{12}—(CF_2)_u—CF_3 \quad (5)$$

(wherein, $R^{12}$ and u area as defined above)

Examples of $R^{12}$ include the same groups as those exemplified above for the group $R^4$ in the general formula (2).

If the value of u exceeds 13, then the compatibility of the component (B) with the component (A) may deteriorate.

Accordingly, examples of the group $R^8$ include the groups shown below.

—$C_2H_4CF_3$
—$C_2H_4C_4F_9$
—$C_2H_4C_6F_{13}$
—$C_2H_4C_8F_{17}$
—$C_2H_4C_{13}F_{27}$

Furthermore, examples of $R^9$ include the groups exemplified above for the group $R^6$, the groups exemplified above for the group $R^7$, and the groups exemplified above for the group $R^8$, although when p=0, at least one of the two $R^9$ groups in the general formula (3) is a group such as those exemplified above for the group $R^7$.

If the value of o exceeds 100, then the hydrophilicity of the component (B) may become overly weak, causing a deterioration in the surfactant action, and/or the compatibility with the component (A) may deteriorate. If the value of p exceeds 30, then the viscosity of the component (B) increases, which may cause a deterioration in the handling properties, and/or the hydrophilicity may become overly high, which can cause a deterioration in the antifoaming properties. If the value of q exceeds 100, then the hydrophilicity of the component (B) may become overly weak, causing a deterioration in the surfactant action, and/or the compatibility with the component (A) may deteriorate.

Specific examples of the component (B) include the compounds shown below.

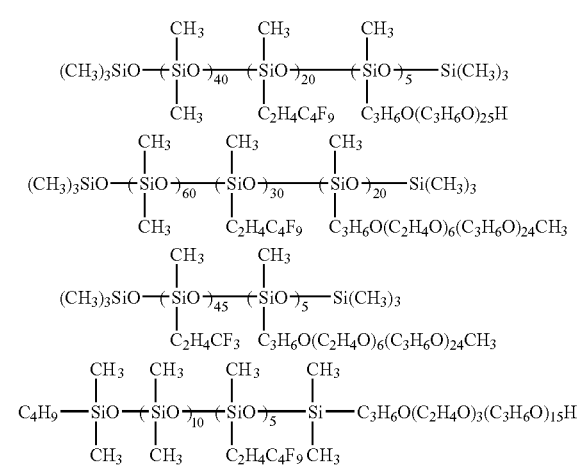

The polyoxyalkylene/perfluoroalkyl-comodified organopolysiloxane of the component (B) may use either a single compound or a combination of two or more different compounds.

[Component (C)]

The glycerol-modified organopolysiloxane of the component (C) in the present invention is represented by the general formula (6) shown below:

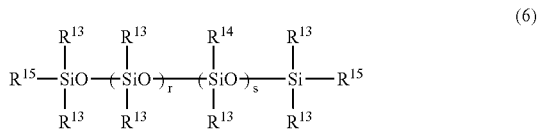

(wherein, $R^{13}$, $R^{14}$, $R^{15}$, r and s are as defined above)

Examples of $R^{13}$ include the same groups as those exemplified above for the group $R^1$ in the general formula (1). Furthermore, as was the case for $R^1$, at least 80 mol % (namely, from 80 to 100 mol %) of all the $R^{13}$ groups are preferably methyl groups.

The group $R^{14}$ represents an organic group represented by the general formula (7) shown below.

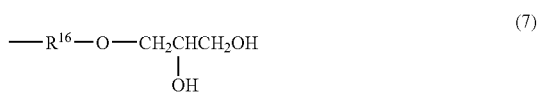

(wherein, $R^{16}$ is as defined above)

Examples of $R^{16}$ include the same groups as those exemplified above for the group $R^4$ in the general formula (2).

Accordingly, examples of the group $R^{14}$ include the groups shown below.

—$C_2H_4OCH_2CH(OH)CH_2OH$
—$C_3H_6OCH_2CH(OH)CH_2OH$
—$C_4H_8OCH_2CH(OH)CH_2OH$

Furthermore, examples of $R^{15}$ include the groups exemplified above for the group $R^{13}$ and the groups exemplified above for the group $R^{14}$, although when s=0, at least one of the two $R^{15}$ groups in the general formula (6) is a group such as those exemplified above for the group $R^{14}$.

If the value of r exceeds 6, then the hydrophilicity of the component (C) may decrease. If the value of s exceeds 2, then the surfactant action of the component (C) may deteriorate.

Specific examples of the component (C) include the compounds shown below.

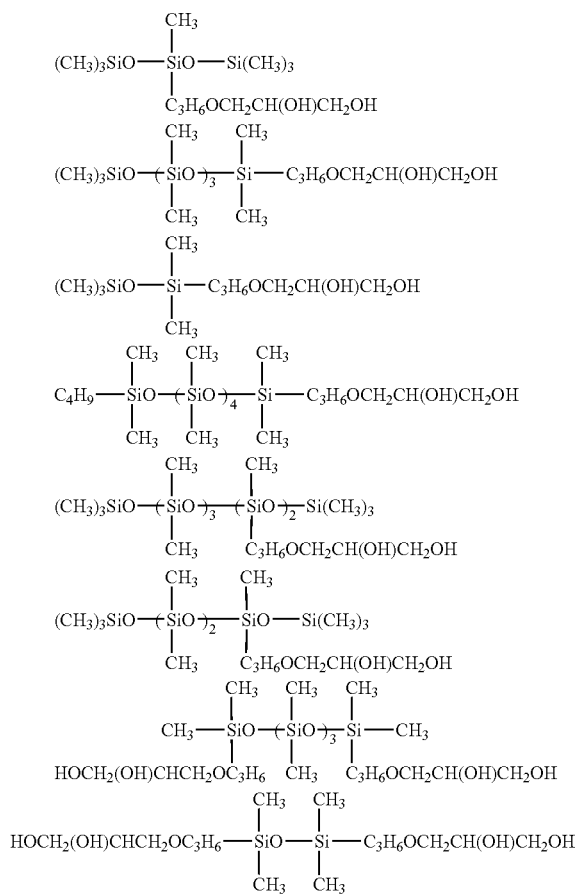

The glycerol-modified organopolysiloxane of the component (C) may use either a single compound or a combination of two or more different compounds.

[Preparation of the Components (A), (B) and (C)]

The polyoxyalkylene-modified organopolysiloxane of the component (A) can be obtained by an addition reaction between an organohydrogenpolysiloxane containing a hydrogen atom bonded to a silicon atom (namely, an SiH group), and a compound having a principal chain comprising a polyoxyalkylene structure and containing an addition reactive alkenyl group such as an allyl group at a molecular chain terminal, in the presence of a platinum group metal-based hydrosilylation reaction catalyst such as platinum or rhodium or the like.

The polyoxyalkylene/perfluoroalkyl-comodified organopolysiloxane of the component (B) can be obtained in the manner described below. First, a perfluoroalkyl group-containing organohydrogenpolysiloxane is obtained by mixing together, in a desired ratio, a cyclic diorganosiloxane that does not contain a perfluoroalkyl group, a cyclic diorganosiloxane containing a perfluoroalkyl group, a cyclic organohydrogensiloxane, and a siloxane oligomer in which both molecular chain terminals are blocked with units represented by a formula: $X-Si(R^6)_2-O_{1/2}$ (wherein, $R^6$ is as defined above, each X represents, independently, an unsubstituted or substituted monovalent hydrocarbon group of 1 to 18 carbon atoms, a hydrogen atom, or an organic group represented by the above general formula (5)) as a terminal blocking agent, and then conducting an equilibration reaction in the presence of an acid catalyst. Subsequently, in a similar manner to that described above for the component (A), the perfluoroalkyl group-containing organohydrogenpolysiloxane and a polyoxyalkylene alkenyl ether such as a polyoxyalkylene monoallyl ether are subjected to an addition reaction, thereby yielding the polyoxyalkylene/perfluoroalkyl-comodified organopolysiloxane of the component (B).

The glycerol-modified organopolysiloxane of the component (C) can be obtained in a similar manner to the component (A), by an addition reaction between an organohydrogenpolysiloxane and a glycerol alkenyl ether such as glycerol monoallyl ether.

The hydrosilylation reaction catalyst mentioned above is preferably a platinum-based catalyst, and specific examples include chloroplatinic acid, alcohol-modified chloroplatinic acid, and chloroplatinic acid-vinylsiloxane complexes. Furthermore, sodium acetate or sodium citrate or the like may be used as a cocatalyst in combination with the platinum-based catalyst.

There are no particular restrictions on the quantity of the hydrosilylation reaction catalyst, provided it is an effective catalytic quantity. A typical quantity, calculated as a mass of the platinum group metal such as platinum or rhodium relative to the combined mass of the organohydrogenpolysiloxane and the alkenyl group-containing compound, is not more than 50 ppm, and quantities of 20 ppm or less are particularly desirable.

The above addition reactions may be conducted within an organic solvent if required. Examples of the organic solvent include aliphatic alcohols such as methanol, ethanol, 2-propanol and butanol; aromatic hydrocarbons such as toluene and xylene; aliphatic or alicyclic hydrocarbons such as n-pentane, n-hexane and cyclohexane; and halogenated hydrocarbons such as dichloromethane, chloroform and carbon tetrachloride. Although there are no particular restrictions on the addition reaction conditions, conducting the reaction for approximately 1 to 10 hours under reflux is preferred.

Examples of the above acid catalyst include acetic acid, hydrochloric acid, sulfuric acid, methanesulfonic acid and trifluoromethanesulfonic acid.

[Preparation of the Composition of the Present Invention]

The composition of the present invention comprises from 51 to 99.9 parts by mass and preferably from 70 to 99 parts by mass of the component (A), from 0.1 to 49 parts by mass and preferably from 1 to 30 parts by mass of the component (B), and from 0 to 48.9 parts by mass and preferably from 0 to 30 parts by mass of the component (C) (provided that the combined quantity of the component (A), the component (B) and the component (C) is 100 parts by mass).

If the quantity of the component (A) is less than 51 parts by mass, then the surfactant action of the resulting composition may deteriorate, whereas if the quantity exceeds 99.9 parts by mass, the composition may become prone to foaming. If the quantity of the component (B) is less than 0.1 parts by mass, then the composition may become prone to foaming, whereas if the quantity exceeds 49 parts by mass, the surfactant action of the resulting composition may deteriorate. If the quantity of the composition (C) exceeds 48.9 parts by mass, then the surfactant action of the resulting composition may deteriorate.

EXAMPLES

Specifics of the present invention are described below with reference to a series of examples and comparative examples, although the present invention is in no way limited by the examples presented below. In the following description, all references to "viscosity" refer to the dynamic viscosity, and represent values measured at 25° C. in accordance with JIS K 2283.

The following compounds were used as the component (A).

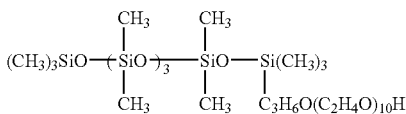

(viscosity: 50.9 mm²/s, a light yellow, transparent liquid)
This compound is termed "A1".

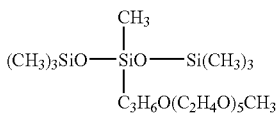

(viscosity: 19.6 mm²/s, a light yellow, transparent liquid)
This compound is termed "A2".

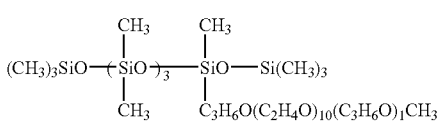

(viscosity: 38.6 mm²/s, a light yellow, transparent liquid)
This compound is termed "A3".

The following compounds were used as the component (B).

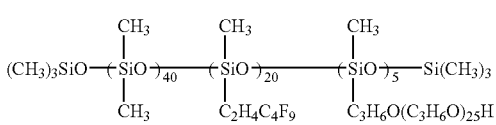

(viscosity: 17,500 mm²/s, a light yellow, transparent liquid)
This compound is termed "B1".

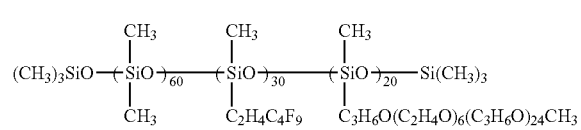

(viscosity: 66,000 mPa·s, a light yellow, transparent liquid)
This compound is termed "B2".

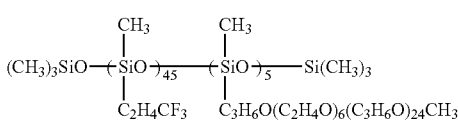

(viscosity: 3,360 mm²/s, a light yellow, transparent liquid)
This compound is termed "B3".

The following compounds were used as the component (C).

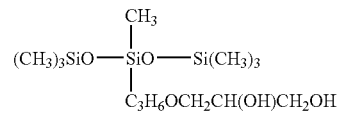

(viscosity: 102 mm²/s, a light yellow, transparent liquid)
This compound is termed "C1".

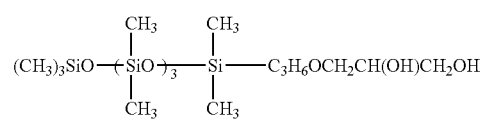

(viscosity: 58.6 mm²/s, a light yellow, transparent liquid)
This compound is termed "C2".

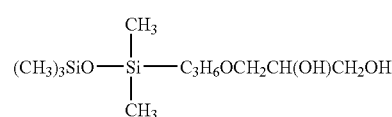

(viscosity: 71.4 mm²/s, a light yellow, transparent liquid)
This compound is termed "C3".

Examples 1 to 5

Compositions were prepared by mixing together the components in the mass ratios shown in Table 1.

TABLE 1

| | | Blend Ratio (parts by mass) | | | | |
|---|---|---|---|---|---|---|
| | | Example 1 | Example 2 | Example 3 | Example 4 | Example 5 |
| Component (A) | A1 | 90.0 | 90.0 | 90.0 | — | — |
| | A2 | — | — | — | 80.0 | — |
| | A3 | — | — | — | — | 90.0 |
| Component (B) | B1 | 5.0 | 10.0 | — | — | 5.0 |
| | B2 | — | — | 5.0 | — | — |
| | B3 | — | — | — | 20.0 | — |
| Component (C) | C1 | 5.0 | — | — | — | — |
| | C2 | — | — | 5.0 | — | — |
| | C3 | — | — | — | — | 5.0 |

Comparative Examples 1 to 5

Compositions were prepared by mixing together the components in the mass ratios shown in Table 2.

The comparative example 1 contained no component (B) or component (C), and used only the component (A).

The comparative example 2 contained no component (B) or component (C), and used only the component (A) and a polyalkylene glycol-based antifoaming agent: Disfoam NKL-5450 (a product name, manufactured by NOF Corporation) as an antifoaming agent (1).

The comparative example 3 contained no component (B) or component (C), and used only the component (A) and a silicone-based antifoaming agent: FS antifoam 001 (a product name, manufactured by Dow Corning Corporation) as an antifoaming agent (2).

TABLE 2

| | | Blend Ratio (parts by mass) | | | | |
|---|---|---|---|---|---|---|
| | | Comparative Example 1 | Comparative Example 2 | Comparative Example 3 | Comparative Example 4 | Comparative Example 5 |
| Component (A) | A1 | 100 | 80.0 | 80.0 | 99.95 | — |
| | A2 | — | — | — | — | 80.0 |
| | A3 | — | — | — | — | — |
| Component (B) | B1 | — | — | — | 0.05 | — |
| | B2 | — | — | — | — | — |
| | B3 | — | — | — | — | — |
| Component (C) | C1 | — | — | — | — | 20.0 |
| | C2 | — | — | — | — | — |
| | C3 | — | — | — | — | — |
| Antifoaming agent (1) | | — | 20.0 | — | — | — |
| Antifoaming agent (2) | | — | — | 20.0 | — | — |

<Evaluation of Properties>

The external appearance and performance of the compositions of the above examples and comparative examples were evaluated. The results are shown in Table 3.

—Foam Suppression—

A 1% by mass aqueous dispersion of each composition was placed in a glass bottle (internal diameter: 4.5 cm, height: 8.0 cm), and the glass bottle was shaken 250 times within one minute. The bottle was then left to stand, and the height (mm) of foam after standing for 30 seconds was measured.

—Foam Breaking—

A 1% by mass aqueous dispersion containing only the component (A) was placed in a glass bottle (internal diameter: 4.5 cm, height: 8.0 cm), and the glass bottle was shaken 250 times within one minute to generate a foam. Subsequently, the component (B) and/or the component (C) were added to the aqueous dispersion to prepare an aqueous dispersion containing each of the components in the mass ratio shown in Table 1 or Table 2, and the glass bottle was then shaken a further 250 times within one minute. The bottle was then left to stand, and the height (mm) of foam after standing for 60 seconds was measured.

—Surface Tension—

A 0.1% by mass aqueous dispersion of each composition was prepared, and the surface tension (mN/m) was measured at 25° C. in accordance with the Wilhelmi method.

TABLE 3

| | External appearance | Foam suppression (mm) | Foam Breaking (mm) | Surface Tension (mN/m) |
|---|---|---|---|---|
| Example 1 | Light yellow, transparent | 1 | 3 | 20.5 |
| Example 2 | Light yellow, transparent | 1 | 4 | 20.7 |
| Example 3 | Light yellow, transparent | 3 | 4 | 20.3 |
| Example 4 | Light yellow, transparent | 5 | 8 | 20.8 |
| Example 5 | Light yellow, transparent | 3 | 5 | 20.3 |
| Comparative example 1 | Light yellow, transparent | 30 | — | 20.1 |
| Comparative example 2 | Light yellow, transparent | 13 | — | 21.8 |
| Comparative example 3 | Cloudy | 15 | — | 22.6 |

TABLE 3-continued

| | External appearance | Foam suppression (mm) | Foam Breaking (mm) | Surface Tension (mN/m) |
|---|---|---|---|---|
| Comparative example 4 | Light yellow, transparent | 30 | — | 20.2 |
| Comparative example 5 | Light yellow, transparent | 4 | 28 | 20.5 |

[Evaluation]

As is evident from the results shown in Table 3, the compositions of the present invention exhibit minimal foaming, and exhibit low surface tension values (namely, have a powerful surfactant action).

What is claimed is:

1. A low-foaming silicone composition, comprising:
(A) from 51 to 99.9 parts by mass of a polyoxyalkylene-modified organopolysiloxane represented by a general formula (1) shown below:

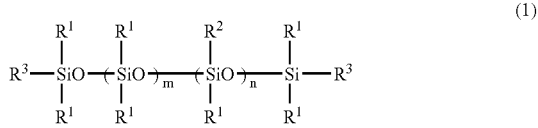

(1)

[wherein, each $R^1$ represents, independently, a hydroxyl group or an unsubstituted or substituted monovalent hydrocarbon group of 1 to 18 carbon atoms,
$R^2$ represents an organic group represented by a general formula (2) shown below:

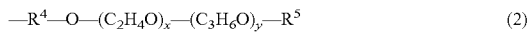

(2)

(wherein, each $R^4$ represents, independently, an unsubstituted or substituted bivalent hydrocarbon group of 2 to 8 carbon atoms, each $R^5$ represents, independently, a hydrogen atom, an unsubstituted or substituted monovalent hydrocarbon group of 1 to 6 carbon atoms, or an acetyl group (—COCH$_3$), x represents an integer from 4 to 15, y represents an integer from 0 to 10, and when y is not zero, an arrangement of repeating units represented by a formula ($C_2H_4O$) and repeating units represented by a formula ($C_3H_6O$) in the general formula (2) is either random or a block-type arrangement), each $R^3$ represents, independently, a hydroxyl group, an unsubstituted or substituted monovalent hydrocarbon group of 1 to 18 carbon atoms, or an organic group represented by the general formula (2), m represents an integer from 0 to 10, n represents an integer from 0 to 10, and a sum of m+n represents an integer from 1 to 20, provided that when n=0, at least one of the two $R^3$ groups in the general formula (1) is an organic group represented by the general formula (2)];

(B) from 0.1 to 49 parts by mass of a polyoxyalkylene/perfluoroalkyl-comodified organopolysiloxane represented by a general formula (3) shown below:

$$R^9-\underset{R^6}{\underset{|}{Si}}O-(\underset{R^6}{\underset{|}{Si}}O)_o-(\underset{R^6}{\underset{|}{Si}}O)_p-(\underset{R^6}{\underset{|}{Si}}O)_q-\underset{R^6}{\underset{|}{Si}}-R^9 \qquad (3)$$

[wherein, each $R^6$ represents, independently, a hydroxyl group or an unsubstituted or substituted monovalent hydrocarbon group of 1 to 18 carbon atoms, $R^7$ represents an organic group represented by a general formula (4) shown below:

$$-R^{10}-O-(C_2H_4O)_z-(C_3H_6O)_w-R^{11} \qquad (4)$$

(wherein, each $R^{10}$ represents, independently, an unsubstituted or substituted bivalent hydrocarbon group of 2 to 8 carbon atoms, each $R^{11}$ represents, independently, a hydrogen atom, an unsubstituted or substituted monovalent hydrocarbon group of 1 to 6 carbon atoms, or an acetyl group ($-COCH_3$), z represents an integer from 0 to 10, w represents an integer from 4 to 60, and when z is not zero, an arrangement of repeating units represented by a formula ($C_2H_4O$) and repeating units represented by a formula ($C_3H_6O$) in the general formula (4) is either random or a block-type arrangement), $R^8$ represents a perfluoroalkyl group-containing organic group represented by a general formula (5) shown below:

$$-R^{12}-(CF_2)_u-CF_3 \qquad (5)$$

(wherein, each $R^{12}$ represents, independently, an unsubstituted or substituted bivalent hydrocarbon group of 2 to 8 carbon atoms, and u represents an integer from 0 to 13), each $R^9$ represents, independently, a hydroxyl group, an unsubstituted or substituted monovalent hydrocarbon group of 1 to 18 carbon atoms, or an organic group represented by the general formula (4) or the general formula (5), o represents an integer from 0 to 100, p represents an integer from 0 to 30, q represents an integer from 1 to 100, and a sum of o+p+q represents an integer from 5 to 200, provided that when p=0, at least one of the two $R^9$ groups in the general formula (3) is an organic group represented by the general formula (4)]; and (C) from 0 to 48.9 parts by mass of a glycerol-modified organopolysiloxane represented by a general formula (6) shown below:

$$R^{15}-\underset{R^{13}}{\underset{|}{Si}}O-(\underset{R^{13}}{\underset{|}{Si}}O)_r-(\underset{R^{13}}{\underset{|}{Si}}O)_s-\underset{R^{13}}{\underset{|}{Si}}-R^{15} \qquad (6)$$

[wherein, each $R^{13}$ represents, independently, an unsubstituted or substituted monovalent hydrocarbon group of 1 to 18 carbon atoms, $R^{14}$ represents an organic group represented by a general formula (7) shown below:

$$-R^{16}-O-CH_2\underset{\underset{OH}{|}}{C}HCH_2OH \qquad (7)$$

(wherein, each $R^{16}$ represents, independently, an unsubstituted or substituted bivalent hydrocarbon group of 2 to 8 carbon atoms), each $R^{15}$ represents, independently, an unsubstituted or substituted monovalent hydrocarbon group of 1 to 18 carbon atoms, or an organic group represented by the general formula (7), r represents an integer from 0 to 6, and s represents an integer from 0 to 2, provided that when s=0, at least one of the two $R^{15}$ groups in the general formula (6) is an organic group represented by the general formula (7)]

(provided that a combined quantity of component (A), component (B) and component (C) is 100 parts by mass).

2. The composition according to claim 1, wherein from 80 to 100 mol % of all the $R^1$ groups are methyl groups.

3. The composition according to claim 1, wherein a molar ratio represented by x/(x+y) is from 0.4 to 1.

4. The composition according to claim 1, wherein from 80 to 100 mol % of all the $R^6$ groups are methyl groups.

5. The composition according to claim 1, wherein a molar ratio represented by z/(z+w) is from 0 to 0.4.

6. The composition according to claim 1, wherein from 80 to 100 mol % of all the $R^{13}$ groups are methyl groups.

7. A spreading agent comprising the composition defined in claim 1.

8. A cleaning agent comprising the composition defined in claim 1.

9. A method for lowering the surface tension of a liquid, comprising adding the composition defined in claim 1 to the liquid.

10. A method for cleaning an article, comprising washing the article with the composition defined in claim 1.

* * * * *